United States Patent [19]

Lange et al.

[11] 4,334,289
[45] Jun. 8, 1982

[54] APPARATUS FOR RECORDING THE ORDER OF USAGE OF LOCATIONS IN MEMORY

[75] Inventors: Ronald E. Lange; Richard J. Fisher, both of Phoenix, Ariz.

[73] Assignee: Honeywell Information Systems Inc., Phoenix, Ariz.

[21] Appl. No.: 124,008

[22] Filed: Feb. 25, 1980

[51] Int. Cl.³ .............................................. G06F 7/00
[52] U.S. Cl. ................................................ 364/900
[58] Field of Search ... 364/200 MS File, 900 MS File

[56] References Cited

U.S. PATENT DOCUMENTS 3,958,228 5/1976 Coombes et al. .................... 364/200

Primary Examiner—Raulfe B. Zache

Attorney, Agent, or Firm—W. W. Holloway, Jr.; N. Prasinos; L. J. Marhoefer

[57] ABSTRACT

There is disclosed herein an apparatus for encoding, storing, updating and decoding data indicating the order of usage of memory locations as in a cache memory. An array of memory bits is encoded by a field programmable logic array each time a memory device or other peripheral is accessed by a method which need change only a portion of all the memory bits in a row. Each row corresponds to a group of memory locations or peripherals to be monitored. When the order of usage of a group of monitored locations is to be determined a field programmable logic array decodes the corresponding row and outputs a signal indicating the least recently used one of the memory locations of interest.

3 Claims, 7 Drawing Figures

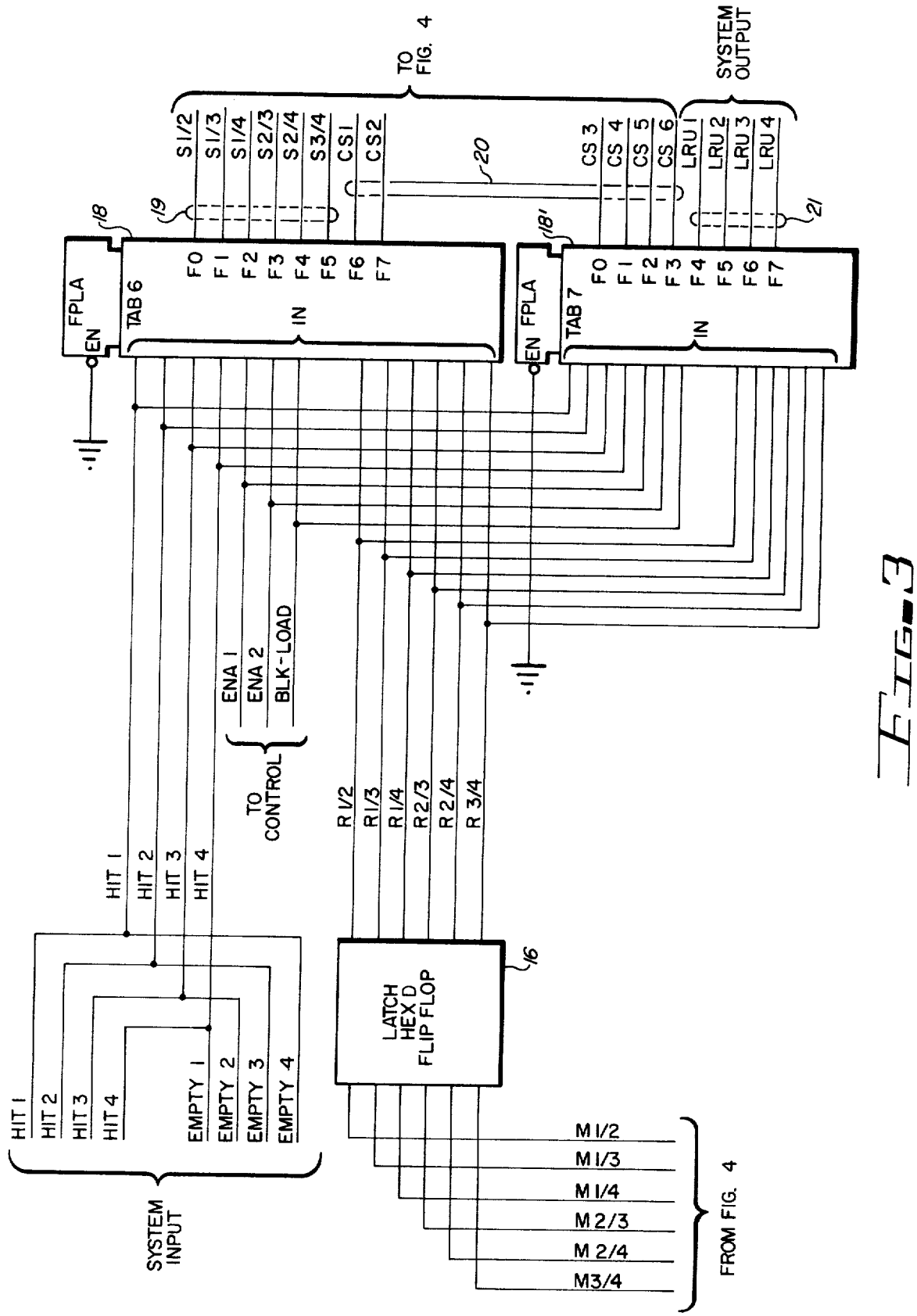

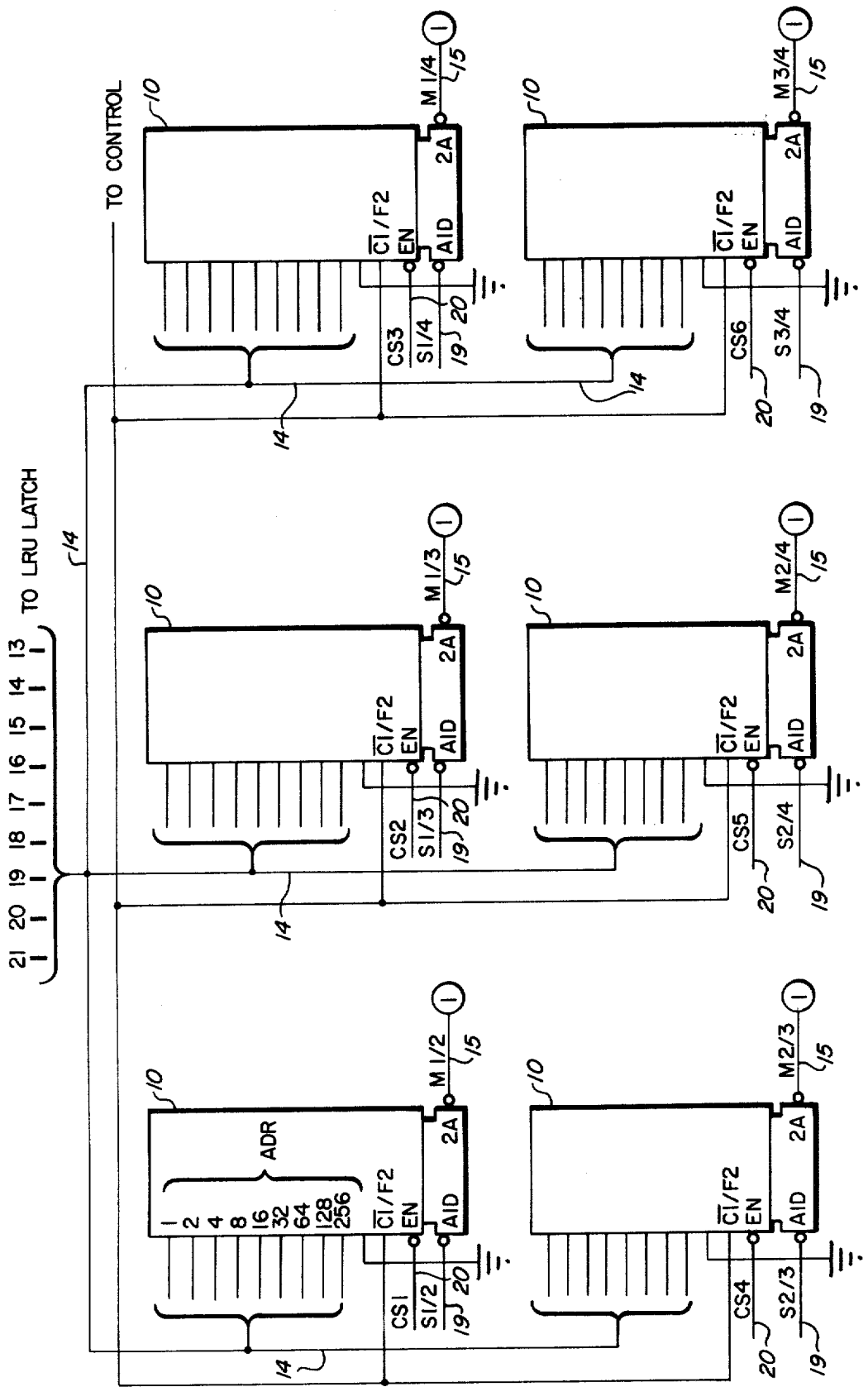

APPARATUS FOR RECORDING THE ORDER OF USAGE OF LOCATIONS IN MEMORY

BACKGROUND OF THE INVENTION

The subject matter of the present invention relates to the subject matter of the copending patent application entitled "Improved Cache Memory Utilizing Selective Clearing and Least Recently Used Updating", Ser. No. 114,854, filed on Jan. 24, 1980 assigned to the assignee of the present invention. That Application discloses a cache memory system which utilizes a least recently used updating subsystem in the cache control for improving the speed of the access by that device. The purpose of the least recently used subsystem is to record the order of usage of the level at a selected column address and the primary directory and to update this information after each transaction with the cache. By keeping a constant record of which level of the selected column of the primary directory is least recently used, it is possible to displace the least recently used level upon a cache miss. By updating the least recently used level or an empty level of the primary directory and the corresponding location in cache store as opposed to a level determined by a round robin counter, it is possible to decrease the access time for transactions with the cache because of the probability that data recently used by a program will be used again in the near future.

The least recently used subsystem has separate utility in any application where the order of usage of certain devices or memory locations is important. Such applications might include control systems, priority networks and in many applications either currently in use or still to be conceived.

SUMMARY OF THE INVENTION

In the broadest form, the apparatus is comprised of only two elements: a means for storing a plurality of LRU bits; and a priority means for decoding the LRU (least recently used) bits when the order of usage is to be determined and for encoding information into these LRU bits to record a new order of usage after a transaction with the cache. The means for storing the LRU bits can be a RAM, (random access memory) and serves to store a sufficient number of LRU bits to represent the relative order of usage of the memory locations or devices of interest. In the preferred embodiment, each LRU bit represents the relative order of usage as between two locations of interest. Therefore, in the preferred embodiment there are as many LRU bits as there are combinations of the locations of interest taken two at a time. The priority network can be fashioned of AND and OR GATES, but in the preferred embodiment, it is a field programmable logic array programmed by burning selected fusible links to establish a predetermined truth table for the desired operations. The logic array is coupled to the data inputs and outputs of the means for storing the LRU bits, and it also has inputs for receiving information regarding empty locations and usage of specific locations after a transaction. The priority network serves to read the status of the LRU bits and decode them upon command to determine the order of usage of the locations of interest. It also utilizes the order of usage data to formulate a new bit pattern for encoding into the LRU bits to reflect the new order of usage.

BRIEF DESCRIPTION OF THE DRAWINGS

FIGS. 3 and 4 are a detailed logic diagram of the LRU system.

FIGS. 6 and 7 are a truth table for the FPLA's chips in the system.

DETAILED DESCRIPTION OF THE PREFERRED EMBODIMENT

Figure 1:
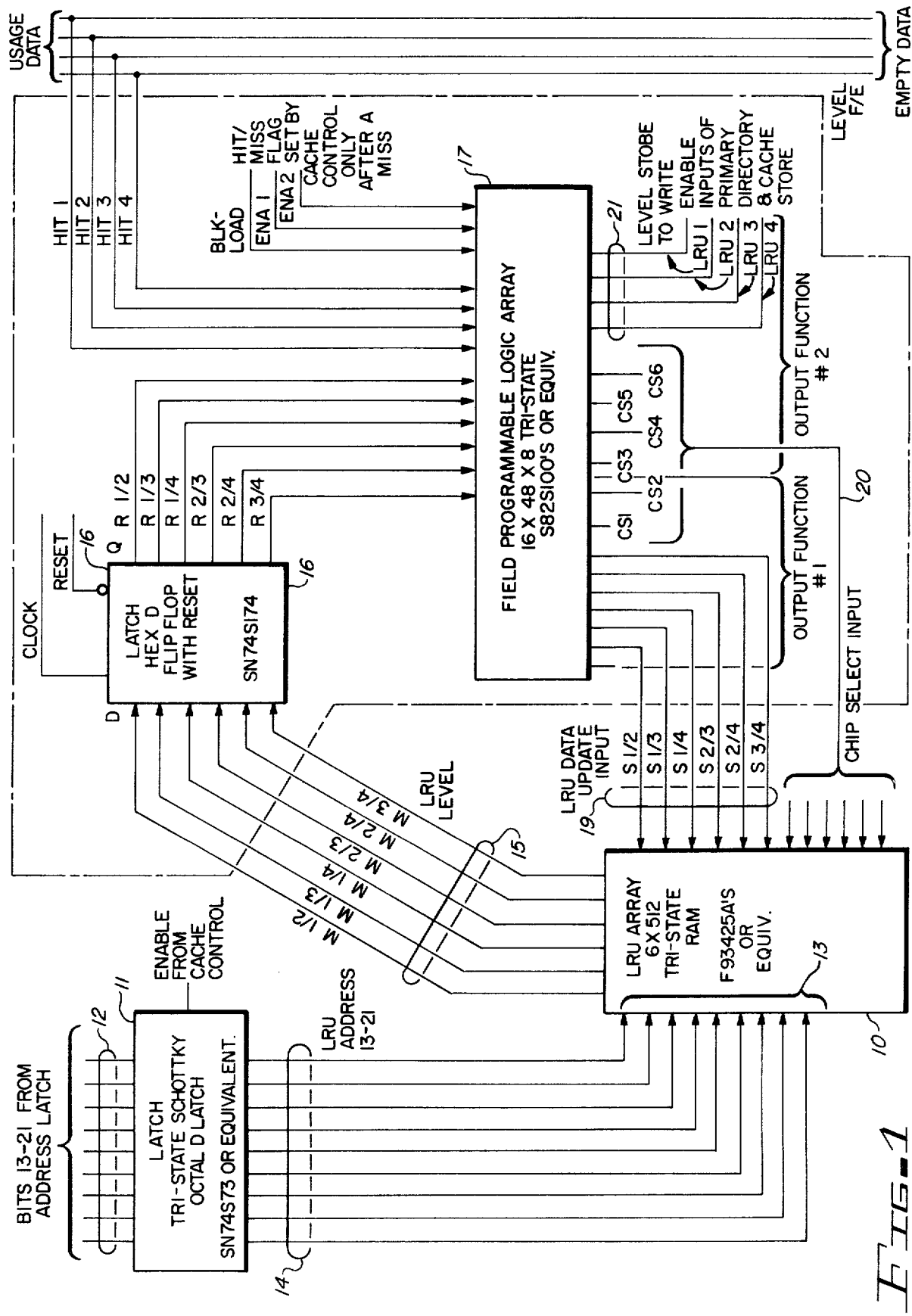
FIG. 1 is a diagram of the functional blocks of the LRU system.

Referring to FIGS. 1, 3 and 4 a description of the detailed logic of the system will be given. LRU array 10 is shown in more detail in FIG. 4. The array can consist of six separate Fairchild 93425A RAM memory chips capable of storing an array of $6 \times 512$ LRU bits. In the preferred embodiment, each row of the array is six bits wide which is the number of combination of four things taken two at a time. Therefore, each row of LRU bits can record the order of usage of four memory locations. Thus the total number of sets of four memory locations which can be tracked is five hundred twelve. Each set of four memory locations has an individual address. Access to any of these sets of four memory locations will require nine address bits. These nine address bits from the address latch for the memory or group of devices to be monitored are written into LRU latch 11 via bus 12 in FIG. 1. Latch 11 can be a tri-state Schottky octal D latch similar to Texas Instruments Model SN 74S373. These address bits are fed to address input 13 of LRU array 10 via bus 14.

The six LRU bits selected are output from LRU array 10 on bus 15 as the following signals: M1/2; M1/3; M1/4; M2/3; M2/4; amd M3/4. These signals represent the status as between two of the four memory locations in the set of four memory locations selected by the address on bus 14. For example, the signal M1/2 represents, in one of its two binary states, that Level 1 has been used since Level 2 was last used, and represents the reverse situation in the opposite binary state. It is readily seen that if there are four memory locations in a particular set, as there are in the preferred embodiment, then these signals represent all the combinations of these four things taken two at a time. These six LRU bits are stored in latch 16 until they are used by field programmable logic array 17.

Figures 2, 5:
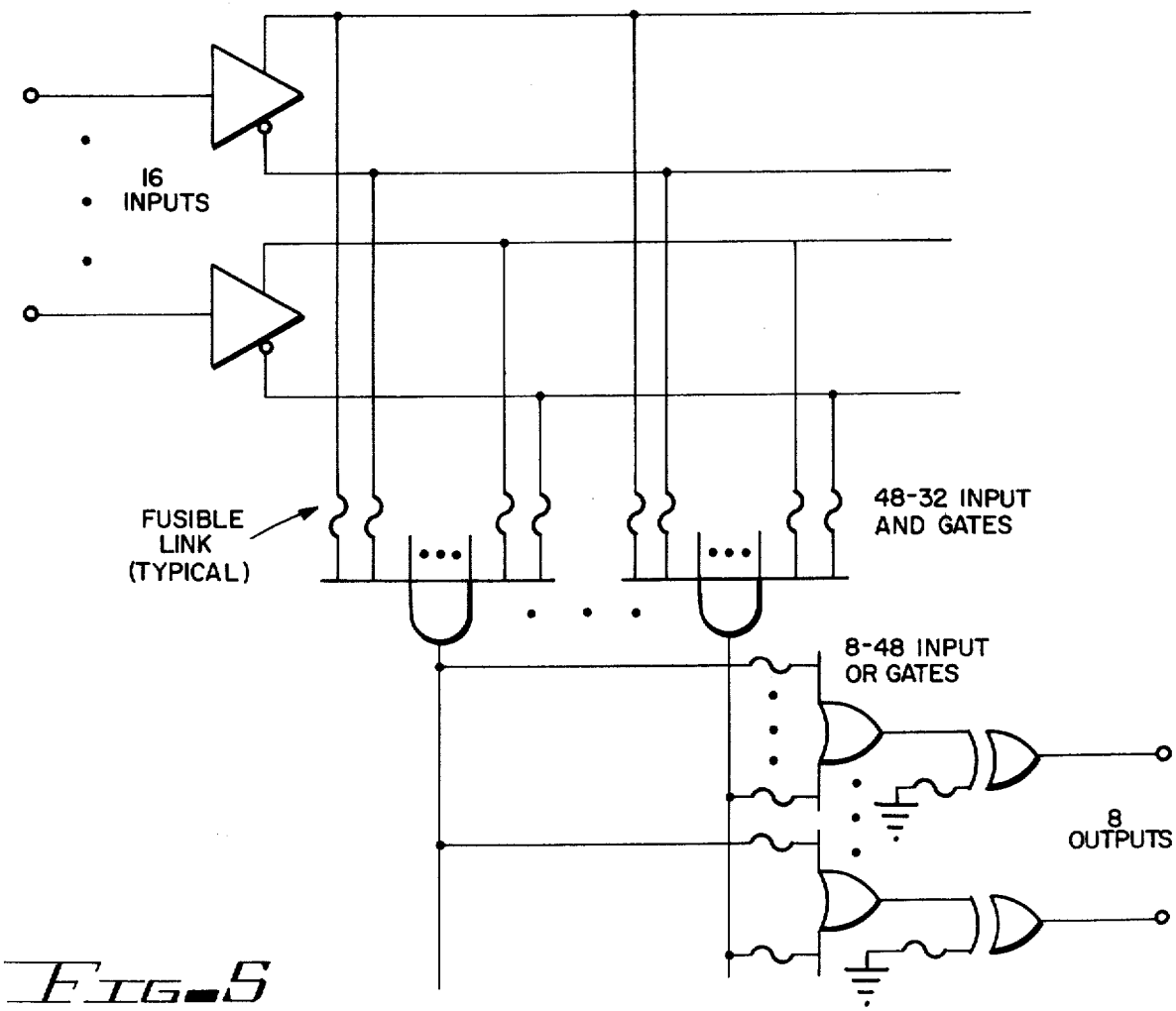
FIG. 2 is a diagram illustrating the mechanics of the LRU coding scheme.
FIG. 5 is a logic diagram showing the general organization of the FPLA chips.

FIG. 2 represents a LRU coding example for four six LRU bits. Line 1 of that figure shows the hypothetical example where all six LRU bits are 0. This state of affairs is equivalent to this situation: Level 1 has been used since Level 2 was last used; Level 1 was used since Level 3 was last used; Level 1 was used since Level 4 was last used; Level 2 was used since Level 3 was last used; Level 2 was used since Level 4 was last used; and Level 3 was used since Level 4 was last used. This means that Level 1 is the most recently used and Level 4 is the least recently used. In this fashion, the order of usage of any of the five hundred twelve sets of four memory locations can be determined. To update the LRU bits to reflect a new order of usage, only three bits need be changed. For example, if Level 2 of the second location is to be marked as the most recently used after an access to that location, only bits s 1/2, 2/3 and 2/4 need be changed. To mark location two as most recently used, bit 5 1/2 should be jammed to a one condition and bits S 2/3 and S 2/4 should be cleared to zero. This bit pattern would then indicate that Level 1 had not been used since Level 2 was last used, Level 2 was used since Level 3 was last used and Level 2 was used since Level 4 was last used.

The decoding and encoding of the LRU bits is performed by a field programmable logic array 17 in FIG. 1. Referring to FIGS. 3 and 5 will clarify the internal structure of the FPLA and its exact connection to the LRU memory array of FIG. 4. FIG. 5 shows that each FPLA, 18 and 18' in FIG. 3, is comprised of forty-eight AND gates each having thirty-two inputs. There are sixteen inputs to each FPLA with each input presented in the inverted and non-inverted form via a fusible link to one of the inputs on each of the forty-eight AND gates. The output of each AND gate is connected via a fusible link to one of the inputs of eight OR gates. Each OR gate has forty-eight inputs or one for each AND gate. The output of each OR gate is connected to one of the eight outputs of the FPLA chip through a two input exclusive OR gate. One input of the exclusive-OR gate is connected to ground through another fusible link. By selectively destroying certain of the fusible links in each FPLA, a fast and economical priorty network may be established. Up to forty-eight selected AND terms may be constructed by destroying predetermined fusible links in the input network to each of the AND gates. These selected AND terms can be combined into up to eight selected OR terms by selectively destroying predetermined fusible links in the input networks to the eight OR gates.

FIG. 3 shows that each of the FPLA chips receives at its inputs the signals HIT 1 through 4, the six LRU bits from latch 16 and three control signals ENA 1, ENA 2 and BLK-LOAD. The signals HIT 1 through 4 supply information on which if any of the memory locations is empty and which of the memory locations has been accessed. In the cache system for which the LRU subsystem was designed, the empty information would be supplied upon a cache miss when the information sought by the main computer was not found in the cache. Likewise, the HIT information would be supplied when the information sought by the computer was found in the cache.

The ENA 1 and 2 signals and the signal BLK-LOAD are signals peculiar to a cache application. ENA 1 and 2 signals signal which half of a host cache system is activated or whether both halves are active. The signal BLK-LOAD indicates whether a hit or a miss has occurred.

FPLA 18 has eight output signals comprised of two chip select signals CS1 and 2 and six LRU bit update signals labeled SX/X. For example, the signal S1/2 is the update signal for the LRU bit containing the relationship between locations 1 and 2 in the selected set of memory locations. These LRU update signals are fed via bus 19 to the data input of each individual memory chip in the LRU array shown in FIG. 4.

Chip select signals 3 through 6 are four of the outputs from FPLA 18' in FIG. 3 and, together with chip select signals 1 and 2 from FPLA 18, form bus 20. This bus couples to the chip select inputs of the individual memory chips of FIG. 4 to enable selected ones of them during updating of the LRU bits and during output of the LRU data. The last four outputs of FPLA 18' are the signals LRU 1 through 4. These four signals comprise the system output and indicate which location in the selected set of four locations is either empty or the least recently used. In the preferred embodiment, the FPLA chips can be SIGNETICS Model 82S100.

The signal C1/F2 coupled to each of the six memory chips in the LRU array of FIG. 4 is a write enable signal which allows the LRU bits to be updated by the FPLA's. This signal is controlled by suitable control circuitry for the particular application in question.

Figure 6:
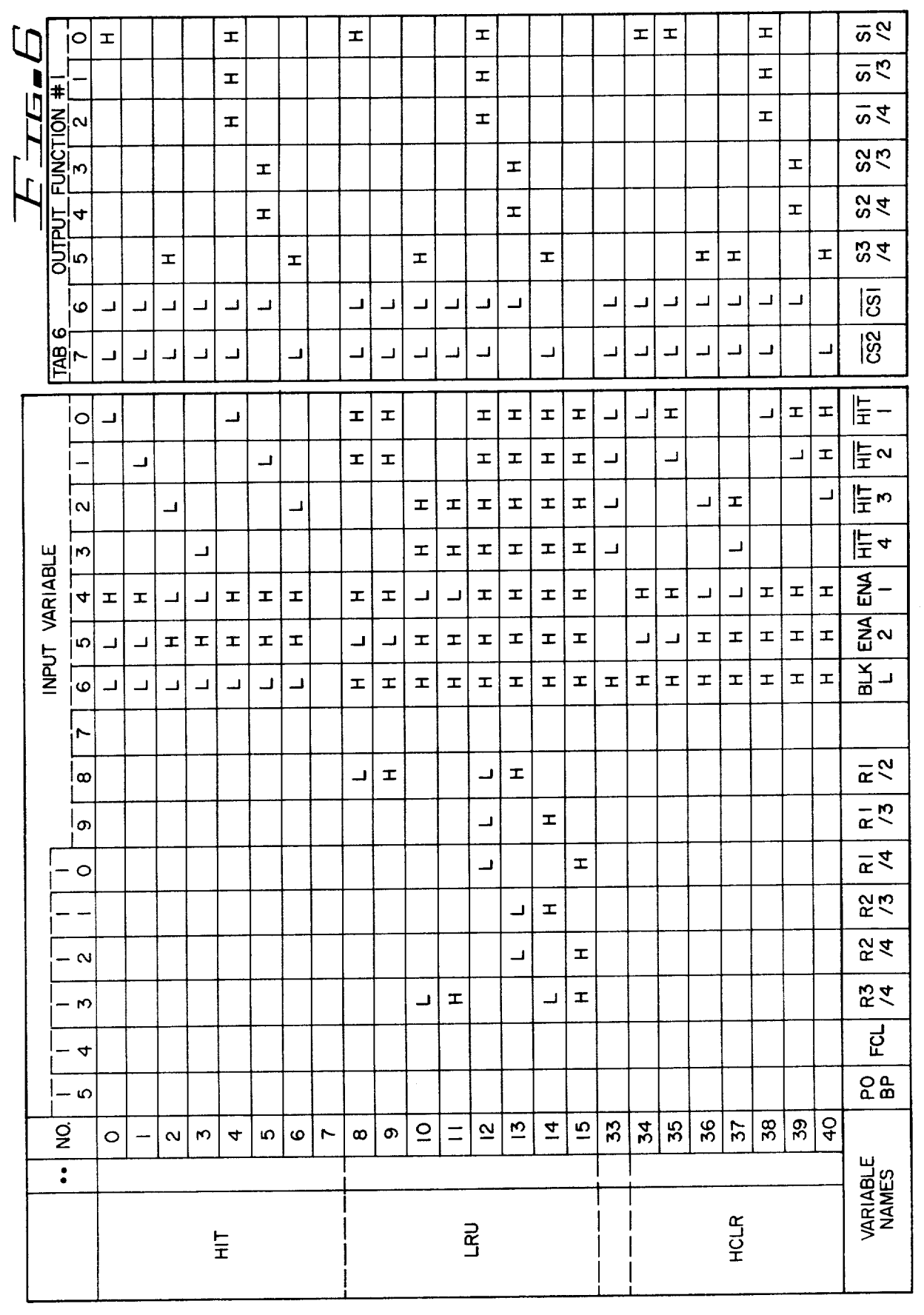
Figure 7:
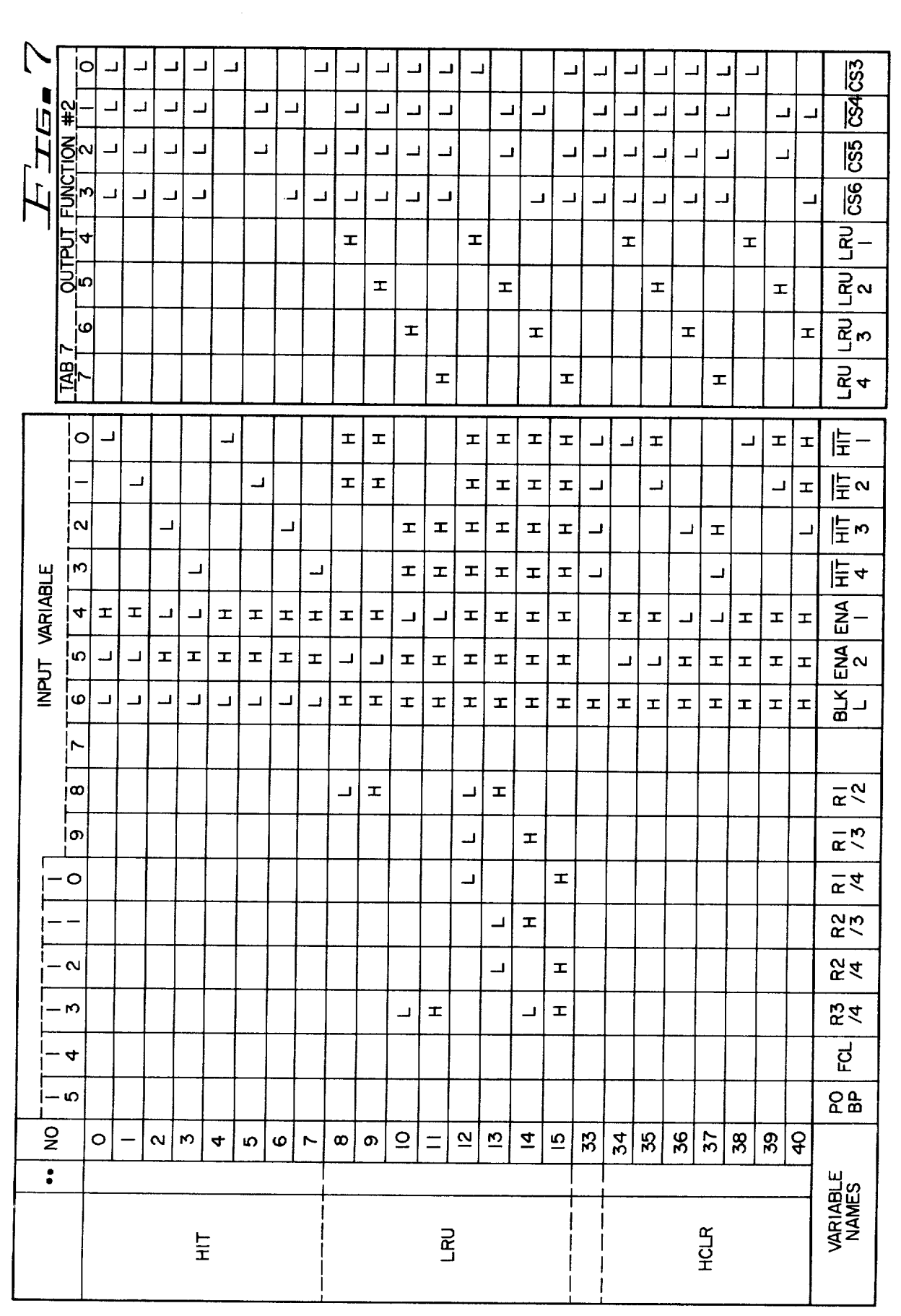

FIG. 6 illustrates the truth table for FPLA 18 in FIG. 3. Likewise, FIG. 7 illustrates the truth table for FPLA 18'. The three sections in the left margin of each table indicate respectively the separate input conditions involved in a HIT operation where the data sought has been found in the cache memory. It could also be used to indicate a usage of a particular device or memory location. Input conditions eight through fifteen are for operations where the least recently used or empty level is desired at outputs F4 through 7 of FPLA 18'. Output lines F0 through F7 respectively are columns 0 through 7 in the righthand section of the tables.

As an example of how to interpret FIGS. 7 and 8, the output functions from both FPLA's will be examined for a particular input condition. We see that for input condition 4 a low is found at the BLK/LOAD input and HIT 1 input to both FPLA's. Likewise highs are found on Enable 1 and Enable 2. This particular state of affairs in the preferred embodiment indicates: That a hit has occurred as indicated by the low on BLK/LOAD; That both halves of the cache are in operation; And that a hit has occurred on Level 1.

The output desired for this state of affairs in the preferred embodiment is an updating of the LRU bits 1/2, 1/3 and 1/4 to indicate that Level 1 is now the most recently used. The outputs LRU 1 through 4 are only activated upon a miss when it is desired to know which level in the cache has been least recently used or is empty for the purposes of determining where to deposit the data words retrieved from main memory. Only updating occurs after a HIT. Thus we see the outputs for input condition 4 are three lows on chip select 1, 2 and 3. These three signals turn on the top three memory chips in FIG. 4 which contain the LRU bits 1/2, 1/3 and 1/4. The three highs on the outputs S1/2, S1/3 and S1/4 are the actual update signals which cause these three LRU bits to be jammed to a one condition. It is seen from FIG. 2, that this condition would correspond to line 2 of the LRU coding example if ones were used to indicate that the first level has been used since the second level was last used. That is a one jammed into the LRU/2 bit would indicate that LEVEL 1 has been used since Level 2 was last used. The reverse case was used for the LRU coding example as an illustration of fact that the particular logic level chosen to represent one status as opposed to the reverse status is completely arbitrary.

The other input conditions in FIGS. 6 and 7 are interpreted in a similar fashion. The input conditions 34 through 40 are conditions which exist in the preferred embodiment for certain situations in which the entire cache should be cleared.

It will be appreciated that although the invention disclosed herein has been described in terms of a preferred embodiment for use in a cache memory apparatus, many other uses are possible. Any such applications which accomplish a similar result in a similar fashion using similar apparatus are intended to be included within the true spirit and scope of the invention.

What is claimed is:

1. An apparatus for recoding the relative order in time of usage of locations in a memory comprising:
    (a) a first means for storing a plurality of LRU bits where there are a sufficient number of said LRU bits to encode therein the order of usage of the 5 locations in said memory having data outputs and inputs;
    (b) a priority array of AND gates having inputs coupled by fusible links to said data outputs of said first means and to said memory for receiving data on the status of said LRU bits and the usage of various said memory locations, and having outputs coupled to an array of OR GATES by fusible links, said OR GATES having outputs coupled to said data inputs of said first means and some of said inputs for presenting output signals indicating the relative order of usage of said memory locations, where selected ones of said fusible links are destroyed to form a logic network, said priority array for decoding said LRU bits to determine the order of usage and for encoding said LRU bits to determine the order of usage and for encoding new information on the order of usage of said memory locations by changing the status of said LRU bits.

2. An apparatus for recoding the relative order of usage of locations in a memory comprising:
    (a) a first means for storing a plurality of LRU bits where each bit represents the relative order of usage as between two locations in said memory, and having a plurality of data inputs for receiving data to update said LRU bits, and having a plurality of data outputs for presenting the status of said LRU bits, and having an address input for receiving the address of a particular group of LRU bits to update or present at said data output;
    (b) a data latch means coupled to said data outputs of said first means for receiving and storing the status of said LRU bits in said first means at the address selected at said address input and having data outputs;
    (c) an address latch means coupled to said address input for receiving the address of a plurality of locations in said memory for which the order of usage is sought and for storing this address and applying it to said address input;
    (d) a logic array means having a first plurality of inputs coupled to the data outputs of said data latch means for receiving the status of said LRU bits, and having a second plurality of inputs for receiving signals indicating which said memory location has been used when it has been used, and having a hit/miss input for receiving a signal indicating that a new usage of a memory location has occurred and said LRU bits should be updated to reflect the new order of usage or to indicate that no new usage has occurred and that the current order of usage is desired, said logic array also having a first plurality of outputs coupled to said data inputs of said first means for applying update data to cause said LRU bits to reflect the new order of usage of said memory locations after each usage, and having a second plurality of outputs for presenting information on the current order of usage.

3. An apparatus as defined in claim 2 wherein said logic array means is comprised of a field programmable logic array having said first and second plurality of inputs and said hit/miss input coupled via a plurality of fusible links to the inputs of a plurality of AND GATES and where the outputs of said AND GATES are each coupled via a fusible link to the inputs of a plurality of OR GATES where the outputs of said OR GATES are coupled to said first and second plurality of outputs, and where said plurality of fusible links are selectively destroyed to give a preestablished relationship between said inputs and otputs.

* * * * *